Figure 1:
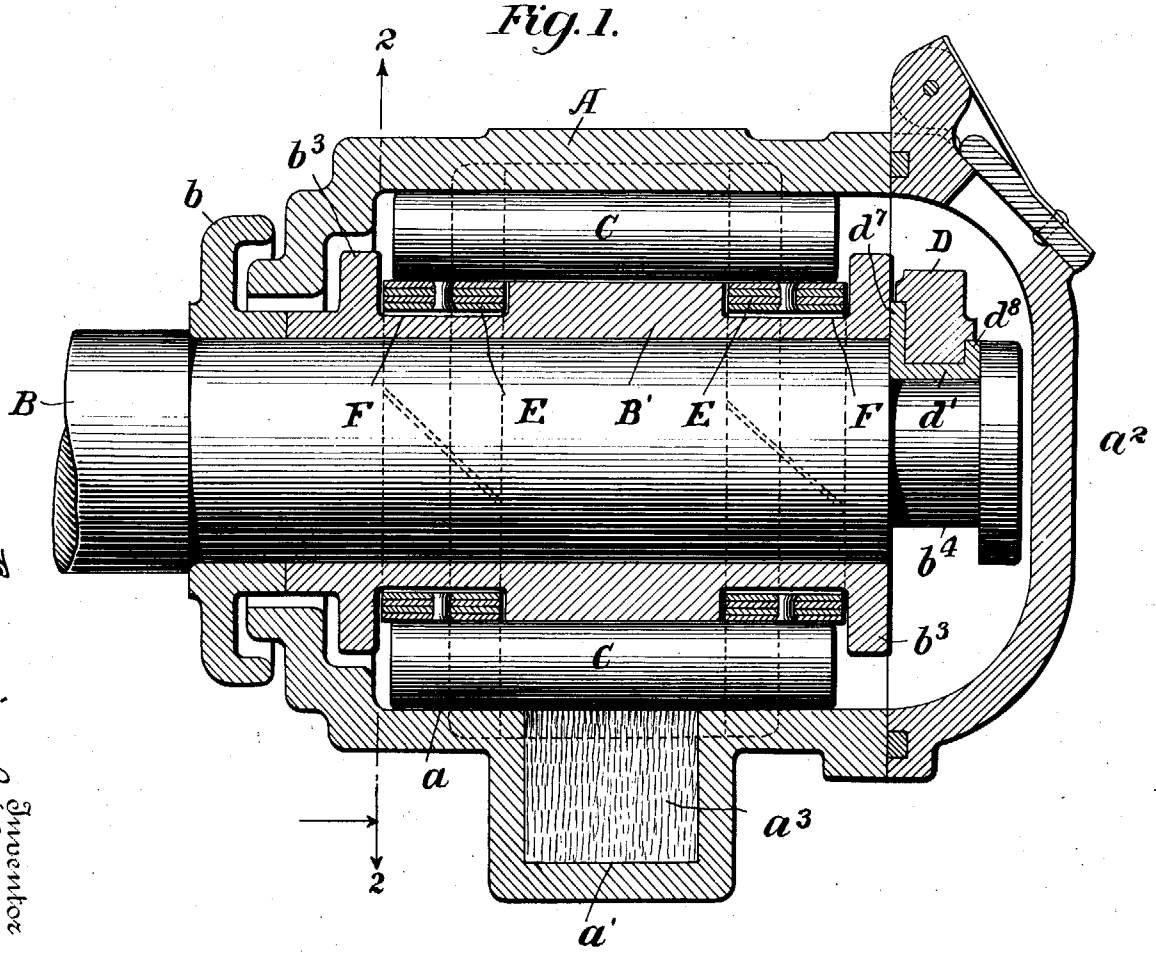

No. 12,498. REISSUED JUNE 26, 1906.

B. S. LAWSON.

BEARING.

APPLICATION FILED APR. 3, 1906.

2 SHEETS—SHEET 1.

Witnesses
J. G. Stinkel
J. J. McCarthy.

Inventor
Benjamin S. Lawson
by Foster Freeman & Watson
Attorneys

No. 12,498. REISSUED JUNE 26, 1906.

B. S. LAWSON.

BEARING.

APPLICATION FILED APR. 3, 1906.

2 SHEETS—SHEET 2.

Witnesses

J. G. Stinkel

J. J. McCarthy.

Inventor by Benjamin S. Lawson

Foster Freeman & Watson

Attorneys

UNITED STATES PATENT OFFICE.

BENJAMIN S. LAWSON, OF BROOKLYN, NEW YORK, ASSIGNOR, BY DIRECT AND MESNE ASSIGNMENTS, OF ONE-HALF TO ASA L. MERRICK AND ONE-FOURTH TO ANDREW J. DE MOTT, OF SYRACUSE, NEW YORK.

BEARING.

No. 12,498. Specification of Reissued Letters Patent. Reissued June 26, 1906.

Original No. 628,479, dated July 11, 1899. Application for reissue filed April 3, 1906. Serial No. 309,707.

*To all whom it may concern:*

Be it known that I, BENJAMIN S. LAWSON, a citizen of the United States, and formerly a resident of Redbank, in the county of Monmouth, State of New Jersey, now residing in Brooklyn, county of Kings, State of New York, have invented certain new and useful Improvements in Roller-Bearings, of which the following is a full, true, and exact description.

My invention relates to improvements in roller-bearings; and the object is to simplify and improve the construction, and thereby to increase the efficiency and durability of the device.

To these ends the invention consists in the construction, combination, and arrangement of the several elements of the device, as will be hereinafter more fully described, and particularly pointed out in the claims.

In the accompanying drawings the same reference characters indicate the same parts of the invention.

Figure 2:
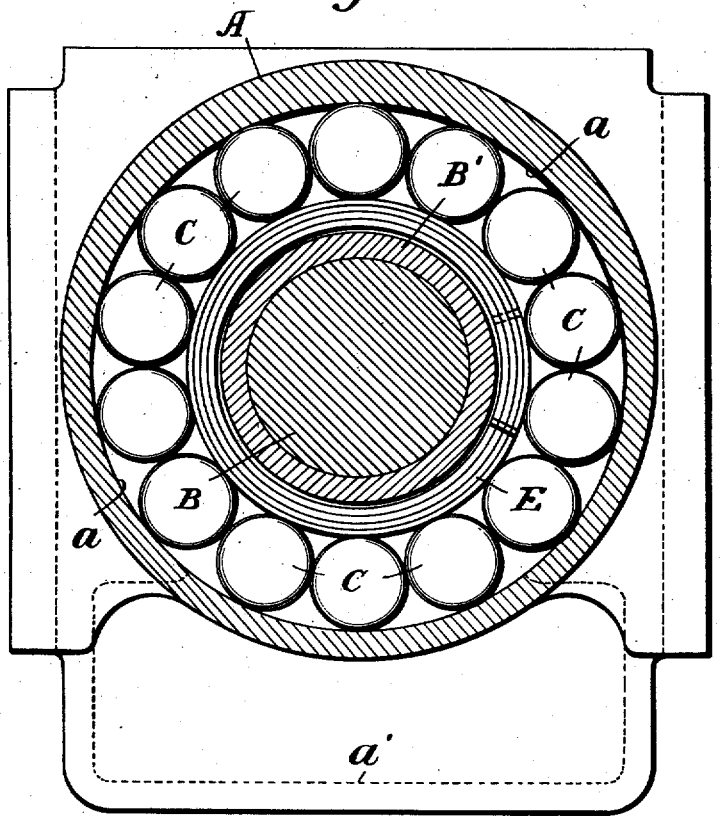
Figure 3:
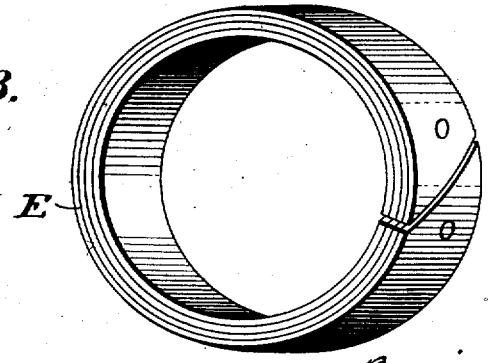

Figure 1 is a longitudinal section of a roller-bearing embodying my invention. Fig. 2 is a transverse section on the line 2 2 of Fig. 1. Fig. 3 is a perspective view of one of the spring-rings.

A denotes the casing provided with the removable bonnet $a^2$, which in turn is provided with the usual hinged door to permit access to the casing for inspection or lubricating purposes. The bottom of the casing is formed with a lubricant-chamber $a'$, in which a suitable absorbent packing $a^3$ is placed to retain the lubricant.

B denotes the axle-journal, the outer end of which is formed with an annular groove $b^4$, and $b$ denotes a dust-guard fixed to the inner end of the journal so as to encompass a flange at and close the contiguous open end of the casing and prevent the entrance of foreign matter to the bearing.

B′ denotes a bearing-sleeve which encompasses without being secured to the journal B, and it is formed at each end with a collar $b^3$.

F F denote annular grooves formed externally on the sleeve to receive the split spring-rings E E.

C C denote rollers cylindrical throughout their length arranged parallel with each other and forming a continuous annular series encompassing the sleeve and spring-rings, the tension of the latter being exerted radially outward to retain the rollers in contact with the concentric bearing-face $a$, forming the inner wall of the casing A.

The roller-bearing face of the sleeve B′ is shorter than and midway between the ends of the rolls and is the portion with which the inner faces of the rollers C C come in contact, whereas the outer faces of said rollers have a bearing for their entire length on the inner face $a$ of the box A. The outer or box-bearing face tends to maintain the rollers parallel to the axis of the shaft or axle; but where the inner or axle bearing is of the same length as or extends to the ends of the rollers the said axle-bearing in operation exerts a tendency to swing the rollers to a position out of parallel to the axis of the shaft. In proportion as the length of the axle-bearing is reduced and carried toward the centers of the rolls the said tendency is reduced, and in the construction shown while an ample bearing for the axle area upon the rollers is secured the reduced central bearing-face can exert little effect in deflecting the rollers, and the latter are maintained by the box-bearing in proper position parallel to the axis of the axle. The spring-rings tend to hold the rollers against the bearing-face of the box even when the latter is worn away to a great extent, and thus prevent the noise which would otherwise occur. As the sleeve B′ is not secured to the axle, the latter can turn independently in starting, when the sleeve and rollers tend to remain in position momentarily by inertia; but thereafter they will rotate with the axle. The rollers approximate in length the distance between the collars $b^3$ $b^3$, the inner walls of which prevent any end play of the rollers.

D represents a yoke the horizontal arms of which are arranged to be seated in correspondingly-shaped recesses formed in the inner face of the bonnet, so as to secure the yoke in place when the bonnet is secured on the box and to permit the removal of the yoke when the bonnet is detached. The central portion of the yoke is preferably arch-shaped to receive the yoke-box $d'$, which in turn snugly fits in the groove $b^4$ in the outer end of the journal. The inner parallel walls of the yoke D engage the corresponding parallel outer walls of the box $d'$ to prevent the latter rotating in the yoke. The upper portion of the box $d'$ is formed with parallel radial flanges $d^7$ and $d^8$, which snugly encompass the parallel faces of the yoke and likewise snugly fit the parallel walls of the journal-groove $b^4$, the flange $d^8$ preventing any inward longitudinal or end movement of the journal and the flange $d^7$ preventing any outward end movement of the same, and this latter flange $d^7$ of the box $d'$ in addition to forming an end bearing in one direction for the journal also extends across the face of the outer end of the sleeve B′, which, as shown in Fig. 1, is alined with the inner wall of the journal-groove $b^4$, thus serving the double purpose of preventing any outward end movement of the sleeve on or with the journal, while any movement of the sleeve on the journal in the opposite direction is prevented by the dust-guard $b$.

In the drawings I have shown the split spring-rings E as being laminated; but any form of spring which will retain the rollers in contact with the annular bearing-face of the casing will answer the same purpose, and various other details of construction which would readily suggest themselves to a skilled mechanic may be employed without departing from the spirit of my invention.

In the present application I do not claim the means for preventing the end thrust of the journal, as that forms the subject-matter of Letters Patent No. 628,480, issued to me July 11, 1899.

Having thus fully described my invention, what I claim as new and useful, and desire to secure by Letters Patent of the United States, is—

1. In a roller-bearing, a casing formed with an internal annular bearing-face, an annular series of rollers cylindrical throughout, and a concentric sleeve encompassed by said series of rollers and having a roller-bearing surface of a less length than the rollers and midway between the ends thereof.

2. In a roller-bearing, a casing formed with an internal circular bearing-face, an axle concentric with said face, a sleeve loose on said axle and constituting a central cylindrical bearing less in length than that of the casing, and an annular series of cylindrical rollers of uniform diameter throughout their length arranged between said bearings, and collars on the sleeve arranged to limit the longitudinal movements of the rollers.

In testimony whereof I have hereunto signed my name, in the presence of two attesting witnesses, this 26th day of March, 1906.

BENJAMIN S. LAWSON.

Witnesses:
CHARLES E. FOSTER,
ASA L. MERRICK.